Sept. 8, 1970  HAYAO KATABAMI  3,528,004
APPARATUS FOR DETECTING THE PROXIMITY OF A METAL BODY
Original Filed Feb. 7, 1964  3 Sheets-Sheet 1

HAYAO KATABAMI
INVENTOR.

BY George B. Oujevolk

HAYAO KATABAMI
INVENTOR.

BY George B. Oujevolk

United States Patent Office 3,528,004
Patented Sept. 8, 1970

3,528,004
APPARATUS FOR DETECTING THE PROXIMITY OF A METAL BODY
Hayao Katabami, 9 Ohmiya-cho, Kawasaki-shi, Japan
Original application Feb. 7, 1964, Ser. No. 343,410. Divided and this application Sept. 25, 1967, Ser. No. 680,602
Int. Cl. G01r 33/12
U.S. Cl. 324—41          2 Claims

ABSTRACT OF THE DISCLOSURE

In detecting proximity of the metallic body, when a non-magnetic metallic body is brought close to one end surface of a cylindrical inductance coil energized by an alternating current, the inductance of the coil will be decreased by the eddy current induced in the metallic body which results in the reduction in the magnetic flux passing through the inductance coil. On the other hand when a magnetic body is brought near the end surface of the inductance coil, the inductance thereof will be increased owing to the increase in the magnetic flux passing through the coil. Such an increase or decrease in inductance can be detected by for example, a high frequency oscillation circuit comprising said inductance coil as one of its elements and a detector for detecting the change in frequency of said high frequency oscillation circuit.

---

This invention relates to switching devices and more particularly to an improved contactless switching device utilizing an improved inductance detecting element, and comprising a circuit composition operable with a greatly high sensitivity.

As is well known in the art contactless switching devices are now widely used in many application, for example to detect the proximity of a metallic body. When detecting variations of an extremely short distance, say 1/10 to 1/100 mm., of proximity of a metallic body with the conventional circuit comprising a high frequency oscillation circuit, and a resonance circuit, a Schmidt circuit and a relay respectively connected in parallel with the output of said high frequency oscillation circuit, for example, the gain of the emitter resonance circuit of a transistor had to be extremely increased. In other words, this brought about difficulties in that said gain became unstable owing to the atmospheric conditions such as temperature and that the diameter of a detecting coil facing to the metallic body had to be increased in order to lengthen the distance of the approximating movement of said metallic body and to effect a contactless relaying.

Accordingly it is an object of this invention to provide an improved contactless switching device which is operable with high sensitivity even when the dimension of a proximity metallic body is extremely small.

It is another object of this invention to provide an improved inductance detecting element having means to concentrate or focus the magnetic flux, thus improving the sensitivity of the detecting element.

These features of the invention which are believed to be novel are specifically set forth in the claims attached hereto. The invention will, however, be better understood and further advantages thereof appreciated from a consideration of the following description and drawings, in which:

Figure 3:
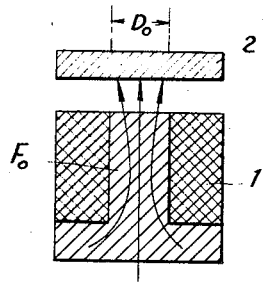
Figure 4:
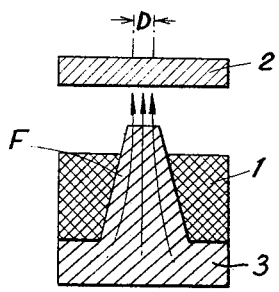
Figure 5:
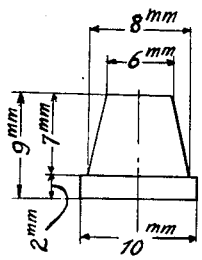
Figure 5:
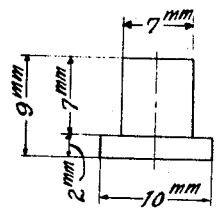
Figure 6:
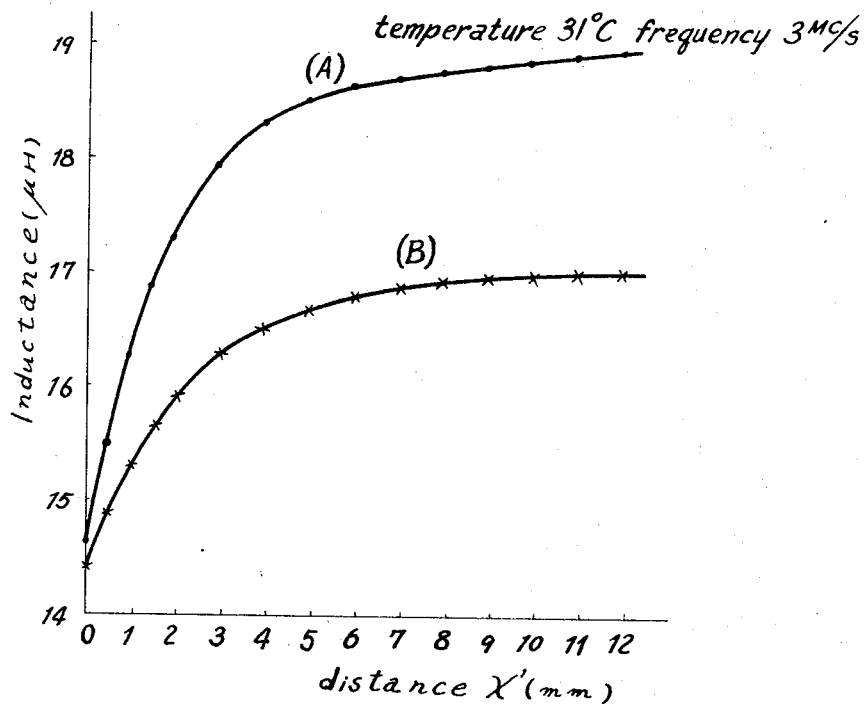
Figure 7:
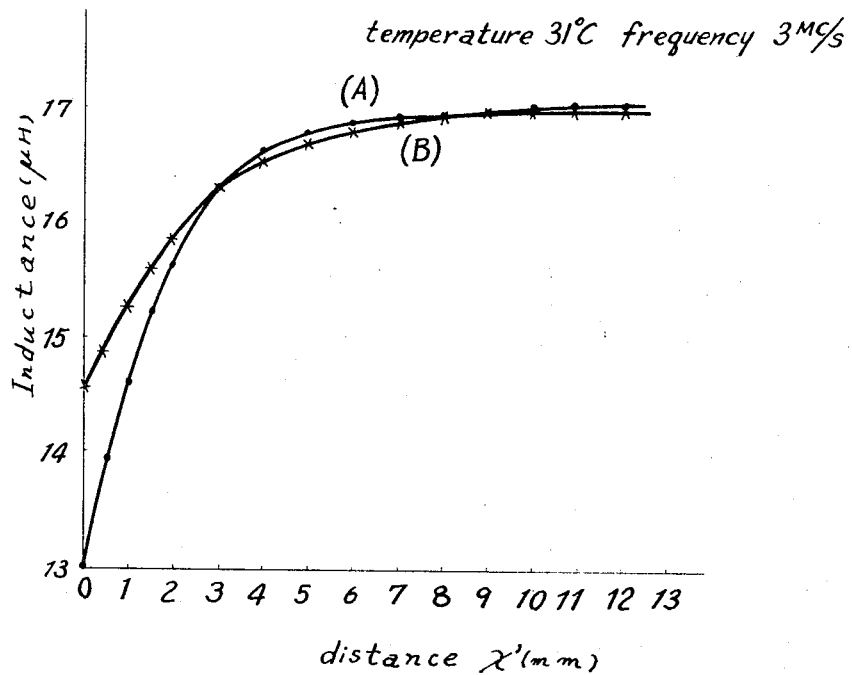

FIG. 3 diagrammatically illustrates a prior inductance detecting element;

FIG. 4 is a similar view of an inductance detecting element of this invention;

FIGS. 5(A) and 5(B) show side views of magnetic cores utilized in the experiments, and FIGS. 6 and 7 show characteristic curves of this invention and those of the prior art.

Figure 1:
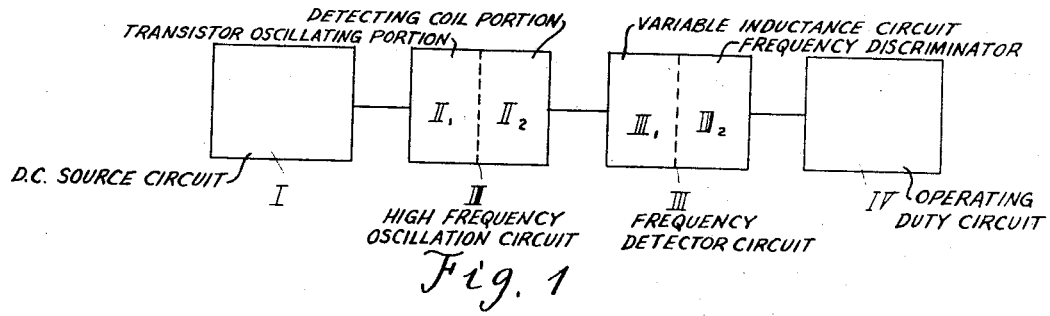
FIG. 1 is a block diagram illustrating the general formation of contactless switching device of this invention.

Referring now to the accompanying drawings, more particularly to FIG. 1, the reference I indicates a DC source circuit. A high frequency oscillation circuit generally designated by II comprises a transistor oscillating portion $II_1$ and a detecting coil portion $II_2$ of an oscillation circuit, which may be a coil wound about a magnetic body in order to particularly increase self-inductance, and which will be fully described in the latter half of this specification. The reference III designates a frequency detector circuit comprising a variable inductance circuit $III_1$ for regulating the mean frequency of said frequency discriminator to be that of the relative distance between the metallic body 2 and the detecting coil portion $II_2$ and a conventional frequency discriminator $III_2$. IV designates an operating duty circuit which in combination with a Schmidt circuit or the like serves to effect switching of a relay, magnetic amplifier, transistor and the like.

Figure 2:
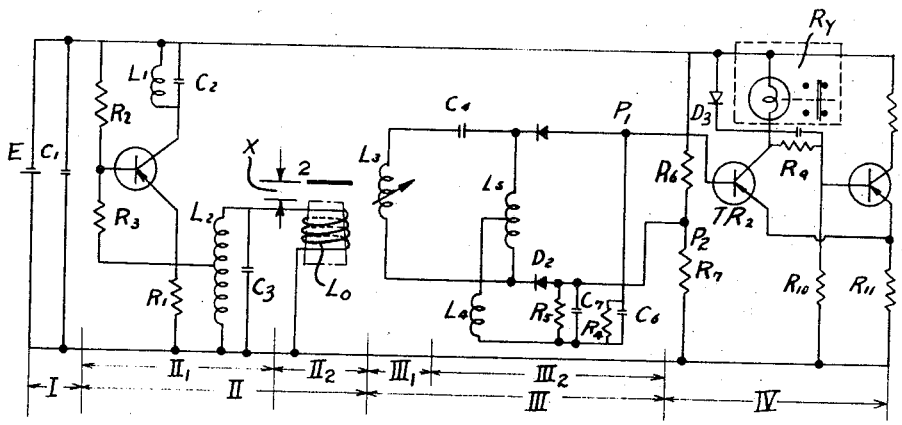
FIG. 2 is a circuit diagram embodying this invention.

The invention will now be described with reference to a particular embodiment thereof shown in FIG. 2. A power source circuit generally indicated by I comprises a battery E and a condenser $C_1$ for eliminating a ripple. In the oscillation circuit II, a transistor $TR_1$ is connected to the negative terminal of the power source circuit I via a parallel circuit of an inductance element $L_1$ and a condenser, while the emitter thereof is connected to the positive terminal of said power source circuit I via a resistor $R_1$. The base of said transistor $TR_1$ is connected to the negative terminal of the power source circuit through a resistor $R_2$ and also connected to one end of a resistor $R_3$, the other end of which is connected to the mid tap of an inductance element $L_2$. Each end of said inductance element $L_2$ is connected to a condenser $C_3$ and the inductance coil $L_0$ which is in the form of a detecting coil and which will be fully described hereinafter.

With references to the frequency detector circuit III, the inductance coil $L_4$ and $L_5$ of the frequency discriminator $III_2$ is wound coaxially with the inductance elements $L_1$ and $L_2$ of the oscillation circuit II and magnetically coupled therewith. Each end of the inductance element $L_5$ is gathered together after passing through a diode $D_1$ of such a polarity as shown and resistor $R_4$, and through a diode $D_2$ and a resistor $R_5$, respectively, and connected to the mid portion of said inductance element $L_5$ via the inductance element $L_4$, said resistors $R_4$ and $R_5$ being connected in parallel with by-pass condensers $C_6$ and $C_7$, respectively. One end of the inductance element $L_5$ is connected to the inductance element $L_3$ of the valuable inductance circuit III, through a condenser $C_4$ and the other end thereof is connected to the other end of said inductance element $L_3$, thus forming a closed circuit. The inductance element $L_3$ is a variable inductance device coarsely magnetically coupled with the inductance element $L_5$ and serves to regulate the mean frequency of the frequency discriminator $III_2$ to conform with the intermediate point of a selected distance between the metallic body 2 and the detecting coil $L_0$, said selected distance being within the maximum confronting distance between said metallic body and the detecting coil within which a switching operation can be done. Thus, when the metallic body of a non-magnetic material, for example, moves close to or remote from said selected distance by an extremely short distance, the inductance of the detecting coil will be decreased or increased accordingly. This change will be represented by a point on the frequency characteristic curve of the conventional frequency discriminator wherein said intermediate point of the selected distance is an origin of said curve. Therefore, a negative or positive signal will be produced between the output terminals $P_1$ and $P_2$ of the discriminator with a mean value of zero potential. By taking said output signal as an input voltage to the operating duty circuit IV, extremely reliable switching will become possible. In FIG. 2 said operating duty circuit IV is shown as comprising resistors $R_6$ and $R_7$ adapted to impose a bias upon the detecting voltage. The above operating duty circuit IV, namely a Schmidt circuit, comprises a $TR_2$ and $TR_3$, a collector resistor $R_8$ for the transistor $TR_3$, a relay RY having an exciting coil of substantially the same resistance value, a diode $D_3$ connected in parallel with said relay and adapted to protect said transistor $TR_2$, bias resistors $R_9$ and $R_{10}$ for said transistor $TR_3$ and a common emitter resistor $R_{11}$ for the transistors $TR_3$. The metallic body 2 and the detecting coil $L_0$ are arranged to form a distance X therebetween and they, by regulating the inductance element $L_3$, rendered to conform with the mean frequency of the discriminator. Then the output of the discriminator will generate a negative voltage when the metallic body 2 is moved close to the detecting coil $L_0$, and a positive voltage when it is moved remote from the detecting coil $L_0$. However, the zero point of said output voltage of the discriminator is so selected as to be slightly lower than the transfer voltage of the next Schmidt circuit, by applying a bias by means of the resistors $R_6$ and $R_7$. Thus, when the metallic body 2 approaches the detecting coil $L_0$ by an extremely short distance, the on-position of the transistor $TR_3$ and off-position of the transistor $TR_2$ are changed into off- and on-position, respectively, so that the relay RY connected to the collector of the transistor $TR_2$ will operate, thus effecting a switching operation. This operation is effective so far as the distance between the metallic body 2 and the detecting coil $L_0$ is less than the distance X above referred to.

In detecting proximity of the metallic body, when a non-magnetic metallic body is brought close to one end surface of a cylindrical inductance coil energized by an alternating current, the inductance of the coil will be decreased by the eddy current induced in the metallic body which results in the reduction in the magnetic flux passing through the inductance coil. On the other hand when a magnetic body is brought near the end surface of the inductance coil, the inductance thereof will be increased owing to the increase in the magnetic flux passing through the coil. Such an increase or decrease in inductance can be detected by for example, a high frequency oscillation circuit comprising said inductance coil as one of its elements and a detector for detecting the change in frequency of said high frequency oscillation circuit.

It is the practice to use a magnetic core for the inductance coil, preferably a magnetic body such as a dust core, in order to increase the efficiency of the inductance coil. However the conventional core is generally in the form of a cylinder having a uniform diameter thoughout its length. In the inductance detecting element of the type above referred to, as the diameter of the inductance coil is decreased, the magnetic flux produced thereby will be more concentrated and hence the patern of magnetic field distribution will become more sharp. Thus, the percent change of the inductance caused by the displacement of a metallic body or the sensitivity of a contactless switching device is increased. On the other hand the direct current output of said detector is determined solely by the percent change in the frequency of the high frequency oscillator or by the percent change in the inductance of the inductance coil and does not depend in any way upon the absolute value thereof. Accordingly, it is advantageous to focus the magnetic flux into a beam to decrease as far as possible scattering of the magnetic flux.

Thus, the invention will now be described with reference to the inductance detecting element $L_0$ above referred to in connection with FIGS. 1 and 2.

FIG. 3 shows a longitudinal section of a prior inductance detecting element comprising a magnetic core, preferably a cylindrical dust core. $F_0$ and an inductance coil 1 wound around the core. It is assumed hereafter that the inductance detecting element is utilized to detect or response to the proximity of the metallic body 2, and that the pattern of magnetic flux distribution on the metallic body 2 has a diameter $D_0$. In order to increase the sensitivity of the detecting element as a proximity relay it is advantageous to make small as far as possible the diameter of the flux pattern. This can be easily attained by making small the diameter of the magnetic core $F_0$ or the internal diameter of the inductance coil 1. However, decrease in the diameter of the cylindrical magnetic core results in the decrease of the self inductance of the inductance coil, thereby decreasing the efficiency of the detecting element. By this reason it has been impossible to decrease the diameter of the cylindrical core beyond a certain limit.

I have succeeded in solving these contradictory requirements by using a magnetic core in the form of a frustum, i.e. a frustum of a cone or a frustum of a pyramid, preferably made of magnetic material, such as a dust core. According to an embodiment of this invention the magnetic flux is concentrated or focussed in a far smaller pattern having a small diameter D′, while maintaining the effective or mean diameter of the magnetic core or coil substantially unchanged. In other words, as the sensitivity of the detecting element has increased owing to increased percent change of inductance of the coil, it is possible to detect the proximity of metallic body having far smaller size and located at more remote position. Further a base plate member 3 expanding in the longitudinal direction as shown in drawings is integrally constructed at the base of the magnetic core. The surrounding magnetic flux concentrated or focussed can be passed through the magnetic core from the top end of the base plate member 3, whereby no magnetic influence is exerted over the other elements even when they are brought in the vicinity of the base plate member 3. Therefore the device as a whole can be constructed in compact size.

To illustrate how the percent change of inductance can be increased according to this invention over prior detecting element, following tests were made. In these tests samples of magnetic core as shown in FIG. 5(A) and 5(B) were used. FIG. 5(A) shows a sample of a magnetic core embodying this invention including a flat cylindrical base of 10 mm. diameter and 2 mm. height and a frustum of a cone of 6 mm. top diameter, 8 mm. base diameter and 7 mm. height. FIG. 5(B) shows a sample of a prior magnetic core including a flat cylindrical base of 10 mm. diameter and 2 mm. height and a cylinder of 7 mm. diameter and 7 mm. height. Both of these samples were made of dust core of the carbonyl iron series and formed to have the same volume and were prepared under the same condition. Inductance coils were wound respectively upon the cylinder and frustum portions of the cores. The tests were carried out in the following manner. The base of each magnetic core was suitably attached to one leg of a micrometer, an aluminium disc having a thickness of 1 mm. and a diameter of 20 mm. was attached to the other leg and the inductance of the coil was measured by using a Q meter at a frequency of 3 mega-cycles per second. Wherein the distance between the top surface of the core and the flat side of the aluminium disc was varied by manipulating the micrometer.

EXPERIMENT A

Changes in inductance viz. distance for the same number of turns of the inductance coils 30 turns of formale resin coated copper wire having a diameter of 0.2 mm. were closely wound in one layer respectively around the frustum and cylinder of the cores shown in FIG. 5(A) and 5(B), and the results of measurements were shown in the following Table 1 and plotted as curves A and B in FIG. 6.

EXPERIMENT B

Changes in inductance viz. distance for the same inductance

To assure the same inductance for both samples 29 turns of the same insulated copper wire as was used in the Experiment A was wound in a single layer upon the frustum of the core shown in FIG. 5(A) and 30 turns of the same wire was wound in a single layer upon the cylinder of the core shown in FIG. 5(B), and the results of the experiments were shown in the following Table 2 and plotted as curves A and B in FIG. 7.

TABLE 1

Temperature, 31° C.; frequency, 3MC/sec.

| Distance X' (mm.) | Inductance (µH) | |
|---|---|---|
| | Sample a | Sample b |
| 0 | 14.65 | 14.45 |
| 0.50 | 15.53 | 14.86 |
| 1.00 | 16.28 | 15.34 |
| 1.50 | 16.85 | 15.63 |
| 2.00 | 17.33 | 15.90 |
| 3.00 | 17.95 | 16.31 |
| 4.00 | 18.36 | 16.53 |
| 5.00 | 18.52 | 16.71 |
| 6.00 | 18.60 | 16.80 |
| 7.00 | 18.68 | 16.90 |
| 8.00 | 18.75 | 16.95 |
| 9.00 | 18.80 | 16.98 |
| 10.00 | 18.83 | 17.03 |
| 11.00 | 18.85 | 17.04 |
| 12.00 | 18.87 | 17.05 |

TABLE 2

Temperature, 31° C.; frequency, 3MC/sec.

| Distance X' (mm.) | Inductance (µH) | |
|---|---|---|
| | Sample a | Sample b |
| 0 | 13.00 | 14.55 |
| 0.5 | 13.95 | 14.86 |
| 1.00 | 14.58 | 15.34 |
| 1.50 | 15.20 | 15.63 |
| 2.00 | 15.65 | 15.90 |
| 3.00 | 16.31 | 16.31 |
| 4.00 | 16.65 | 16.53 |
| 5.00 | 16.81 | 16.71 |
| 6.00 | 16.88 | 16.80 |
| 7.00 | 16.92 | 16.90 |
| 8.00 | 16.98 | 16.97 |
| 9.00 | 17.00 | 17.00 |
| 10.00 | 17.02 | 17.03 |
| 11.00 | 17.05 | 17.04 |
| 12.00 | 17.06 | 17.05 |

As can be clearly noted from FIGS. 6 and 7, the inclination of curves A is much steeper than that of curves B, which means that percent change in inductance or the sensitivity of the inductance detecting element of this invention is higher than that of the prior art.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

What is claimed is:

1. Apparatus for detecting the proximity of a metal body of either magnetic or non-magnetic material comprising an R.F. oscillator driven by a power source circuit, said oscillator including a variable inductance tuning element to vary the oscillator frequency, said element including a frustumed magnetic core and a coil wound circumferentially about the core, said coil being connected as the variable inductance, the inductance of said coil being increased in response to a magnetic body coming in proximity to the core, the inductance of said coil being decreased due to eddy currents in the core in response to a non-magnetic metallic body coming in proximity with the core, the oscillator frequency being varied in opposite directions relative to a center frequency in response to the coil inductance being varied by the magnetic body and the non-magnetic body being in proximity with the core, a frequency discriminator responsive to the oscillator frequency, said discriminator deriving a signal of predetermined amplitude only in response to the oscillator center frequency, said oscillator having as its main element a transistor and including a first parallel circuit consisting of a first condenser and a first inductance element connected between a collector of said transistor and a negative terminal of said power source circuit, and a second parallel circuit consisting of a second condenser and a second inductance element connected in the base circuit of said transistor, said second inductance element being coaxially arranged with said first inductance element, a center tap on said second inductance element connected to the base of said transistor, said coil being interposed between both ends of said second condenser of said second parallel circuit and disposed to vary the oscillating frequency of said oscillator when the inductance factor between said emitter and base is varied as a metal object approaches or retreats from the vicinity of said coil and core; said frequency discriminator connected to said power source circuit and having a series circuit consisting of a condenser and a variable inductance element, a third inductance element and a fourth inductance element, said variable inductance element being loosely magnetically coupled with said third inductance element, the value of said variable inductance element being so adjustable as to abritrarily determined the center frequency of the frequency detector circuit, said third inductance element being interposed between both ends of said series circuit and coaxially arranged with said first and second inductance elements and said variable inductance element, said fourth inductance element having one end connected to a midportion of the third inductance element and another end connected to one end of an output of said discriminator; a signal amplitude detector responsive to the signal derived from the discriminator for deriving another signal having a first value in response to the predetermined amplitude and a second value in response to amplitudes of the discriminator signal different from the predetermined amplitude, the first and second values of the another signal being respectively indicative of the absence and presence of a metal body in proximity to the core.

2. Apparatus for detecting the proximity of a metal body according to claim 1, wherein said detecting section varying inductance means is a magnetic dust core in the form of a frustrum with top and bottom surfaces, said bottom surface being in the shape of a plate expanded in the longitudinal direction, said top surface being disposed so as to be parallel to an adjacent flat surface of said metal object, an indutance coil being wound around said magnetic dust core, whereby a magnetic flux passing through said dust core is focussed at the top surface to provide a relationship of direct proportion between the distance of said metal object from the top surface and the inductance of said inductance coil circuit and the surrounding magnetic flux can be absorbed from the peripheral end of said plate at the bottom surface.

References Cited

UNITED STATES PATENTS

| 2,779,904 | 1/1957 | Barron | 331—65 |
| 2,321,355 | 6/1943 | Berman | 324—41 |
| 2,321,356 | 6/1943 | Berman | 324—41 |
| 2,376,659 | 5/1945 | Chireix | 324—3 |
| 3,046,479 | 7/1962 | Mead et al. | 324—82 |

FOREIGN PATENTS 662,393  4/1963  Canada.

RUDOLPH V. ROLINEC, Primary Examiner

R. J. CORCORAN, Assistant Examiner

U.S. Cl. X.R.

340—258, 282